(No Model.)

J. C. BLOOM.
Nut Lock.

No. 243,493. Patented June 28, 1881.

Attest
John C. Perkins
Thomas A. Rud

Inventor
John C. Bloom
Per Lucius C. West
Atty

UNITED STATES PATENT OFFICE.

JOHN C. BLOOM, OF KALAMAZOO, MICHIGAN, ASSIGNOR OF ONE-HALF TO FRED N. ROOT, OF SAME PLACE.

NUT-LOCK.

SPECIFICATION forming part of Letters Patent No. 243,493, dated June 28, 1881.

Application filed February 1, 1881. (No model.)

*To all whom it may concern:*

Be it known that I, JOHN C. BLOOM, of Kalamazoo, Michigan, have invented new and useful Improvements in Nut-Locking, of which the following is a specification.

My invention relates especially to that method of nut-locking in which the bolt is not originally constructed with any reference to locking the nut therewith, and in which the nut has a locking-hole through its side emerging into the threaded bolt-hole thereof.

My invention consists in certain improvements in said method herein fully set forth, whereby a saving of expense in construction and of time in the locking is effected.

Heretofore nuts have been constructed with a locking-hole at right angles with the threaded bolt-hole, said locking-hole being also threaded and adapted to receive a threaded and pointed locking-bolt, which is screwed down into it until the point rigidly engages the main bolt through the nut, where it is allowed to remain. By this method much time is required to screw the locking-bolts down, and in case of rust or other causes the operator might be misled, thinking the point had engaged the bolt when it had not. By rust, also, and other causes the locking-bolts are liable to become so rigidly set as to be impossible to be removed when desiring to remove the nut.

In effecting a locking of the nut by my method a change in the construction of the common threaded nut is necessary, which consists in forming the locking-hole of the nut smooth and of the same size throughout, or of funnel shape tapered to a small end, of the size of a pin-point, just pricking through into the threaded hole. I lock the nut thus constructed by either spreading the threads of the bolt out to rigidly engage the periphery of the lower end of the locking-hole by inserting a suitable instrument in said locking-hole and striking on it with a hammer, or by forcing that portion of the nut surrounding the small end of the funnel-shaped hole out to engage the threads of the threaded bolt with the same implements.

It will be observed that in either of the equivalent modes of locking the nut the implement which is struck upon to displace the threads is then removed from the hole, as it in no way constitutes an element of the lock itself after the locking is effected.

Figure 1:
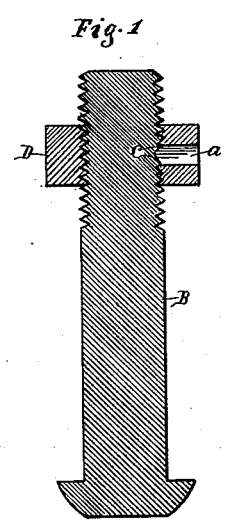
Figure 2:
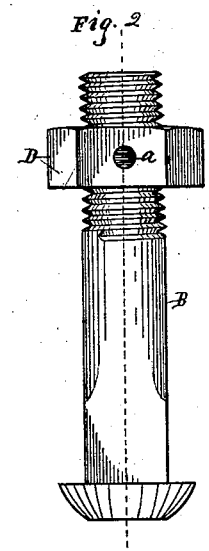
Figure 3:
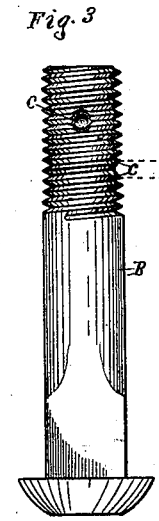
Figure 4:
Figure 5:
Figure 6:
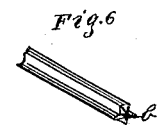
Figure 7:
Figure 8:
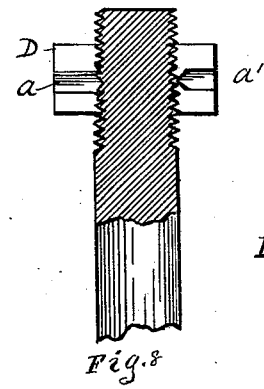

In the drawings forming a part of this specification, Figure 1 is a sectional view on the dotted line in Fig. 2, showing the nut having the straight hole locked with the threaded bolt; Fig. 2, plan view; Fig. 3, bolt with nut removed, showing the spreading of the threads in locking the nut. Figs. 4, 5, 6, and 7 illustrate implements which may be used to spread the bolt-threads, and Fig. 8 shows a nut having the hole funnel form.

$a$ is the straight smooth hole, of the same size throughout in nut D; $a'$, the funnel-form hole in said nut, Fig. 8. In forming these holes the base end should come between the threads of the threaded bolt.

$e$, $s$, $b$, and $y$ are the implements that may be used, or anything suitable adapted to be struck on with a hammer may be employed.

By this method of locking nuts the objections found in previous methods are obviated, and for which reason it will be found of especial utility in locking the nuts to the bolts used in connecting the rails on a car-track exposed to the action of the weather.

In the operation in the use of nuts having the funnel-form locking-hole $a'$ the base of said hole finally becomes as large as the top end, when the locking may still be continued with said nut in the manner previously described in reference to the hole $a$.

What I claim, and desire to secure by Letters Patent, is—

As a means for facilitating the locking of a screw-nut to a screw-bolt, a funnel-shaped hole located in the side of said nut, which hole either opens into the bolt-hole by a very small orifice terminating the lower end of the funnel, or is separated from said bolt-hole by a thin film of metal easily forced away by a punch or equivalent device, all substantially as described and shown, for the object set forth.

JOHN C. BLOOM.

Witnesses:
LAWRENCE N. BURKE,
CHARLES J. LEWIS.